United States Patent Office 3,737,382
Patented June 5, 1973

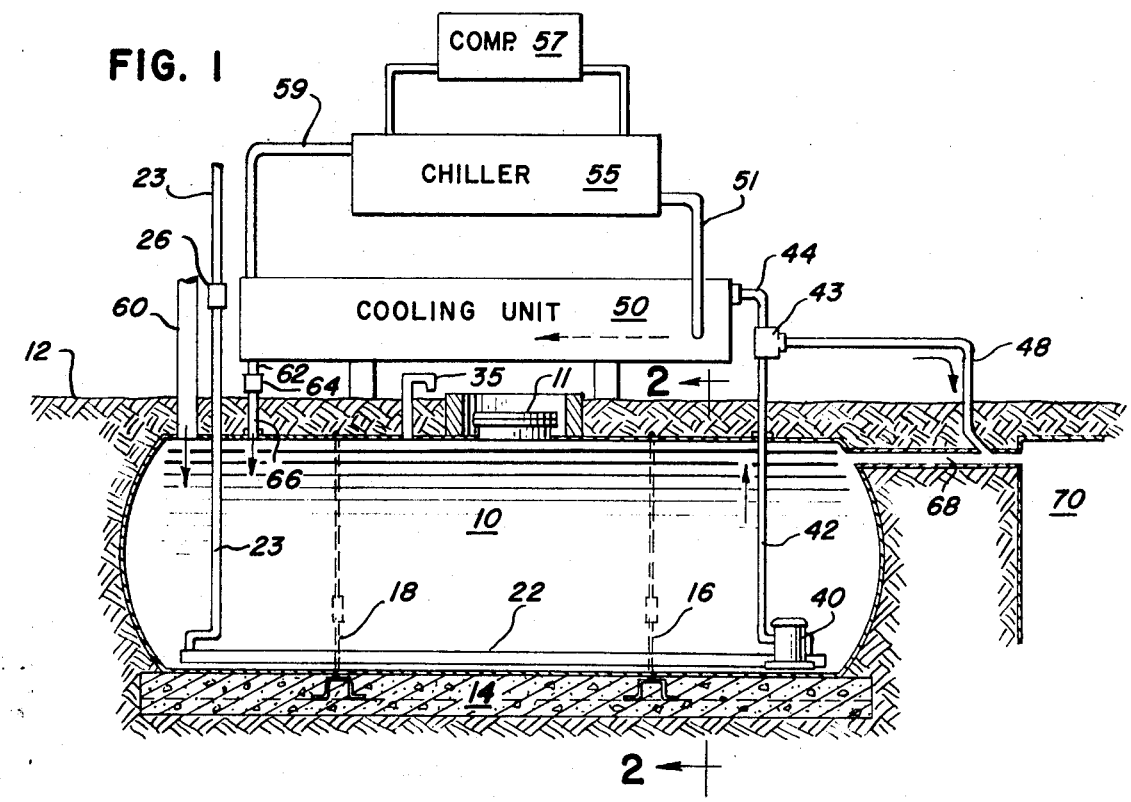
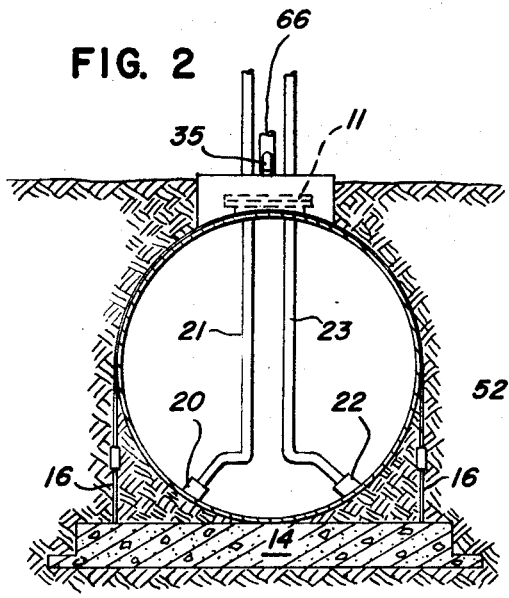
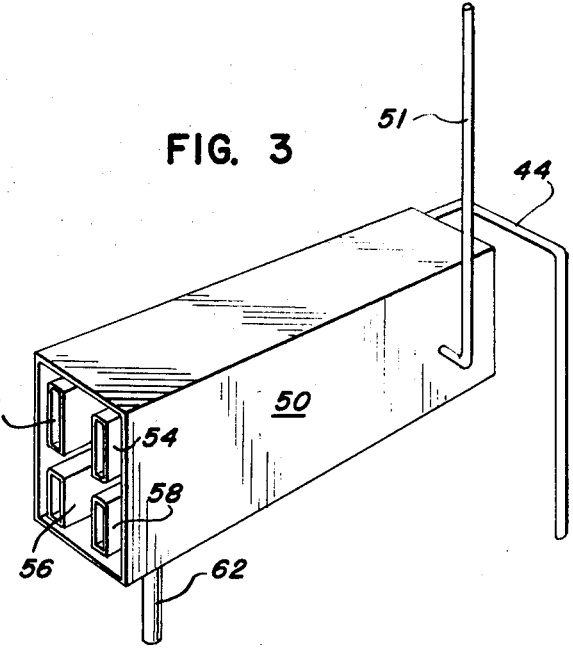

3,737,382
REFRIGERATED SURGE TANK FOR USE WITH AEROBIC SEWAGE DIGESTION SYSTEM
Richard J. Fletcher, 409 E. Franklin, Apt. 5, and Robert I. Fletcher, 620 Highwood Ave., both of Greencastle, Ind. 46135
Filed Sept. 27, 1971, Ser. No. 183,874
Int. Cl. C02b 1/12; C02c 1/02
U.S. Cl. 210—12
17 Claims

ABSTRACT OF THE DISCLOSURE

A refrigerated surge tank is used to hold sewage at a reduced temperature and provide an aerobic digestion system with a regulated sewage feed without substantial loss of bio-nutrients or the generation of offensive odors while the sewage is being held. Preferably the surge tank is also provided with means for oxygenating the sewage being held.

---

The present invention relates to refrigerated sewage surge tanks and more particularly to refrigerated sewage surge tanks equipped with aeration means for use in connection with aerobic sewage disposal systems. The refrigerated sewage surge tanks of the present invention are particularly useful in aerobic disposal systems in which the sewage input is non-uniform with respect to time. In other words, the present invention is particularly adapted for use in treating sewage from institutions such as schools, which typically generate sewage during a finite portion of the day, five days a week, with little being generated either at night or over the weekends.

Aerobic sewage treatment processes are well known in the art, as exemplified by the activated sludge process. These processes accomplish the decomposition of the sewage by aerobic bacteria which consume the sewage as food, when adequate oxygen is available. As the sewage is consumed by the aerobic bacteria, the numbers of bacteria increase through reproduction, and the ability of the bacteria to consume increased amount of sewage is similarly increased. When the volume of the incoming sewage diminishes, less food is available to the bacteria, and the bacterial colony diminishes in size as the bacteria begin to die. When the sewage input is low and the bacterial level has dropped to a low level, in the prior art aerobic digestion processes, a surge of sewage input in to the aerobic system will pass through the system without being completely digested. Since it requires considerable amount of time to build up the bacterial colony to a level sufficient to handle a sudden increase in input. The inability of the bacteria colony to handle large volumes or surges of sewage during the growth period, permits some sewage to pass through the system without treatment or without adequate treatment. While the use of a surge tank or a holding tank in connection with aerobic digestion systems would appear to be a solution to the problem, it has been found that the use of a simple holding tank does not overcome these problems, and indeed generates other problems. When quantities of raw sewage are held in a conventional tank, decomposition sets in immediately with resultant loss of the bio-nutrient matter in the sewage. The decomposition is essentially anaerobic if no air is supplied to the holding tank. The anaerobic digestion produces odoriferous gases which are objectionable. If the holding tanks are aerated, the decomposition becomes aerobic, but the decomposition proceeds in the holding tank with concomitant loss of bio-nutrients, which negates the purpose of the holding tank, i.e., to provide a uniform or regular flow of sewage (bio-nutrients) to the main aerobic digestion process.

The present invention overcomes the aforesaid problems by providing a refrigerated sewage surge tank or holding tank. It has been found that by holding sewage at reduced temperatures, particularly temperatures approaching 32° F., that the decomposition process is substantially obviated and that sewage may be held at such low temperatures with little or no decomposition for periods of time in excess of 48 hours. Preferably, the refrigerated surge tank is also provided with a means to introduce an oxygen containing gas, such as air, oxygen or mixtures thereof throughout the refrigerated sewage in the tank. It has been found that oxygenating the refrigerated sewage will prevent any anaerobic decomposition from taking place and thereby avoid the formation of any offensive odors. Further, it has been found that the aeration of the sewage provides a mixing action which helps to maintain suspended solids or particulate matter which may be present in the sewage.

The present invention contemplates that the sewage surge tank which is sufficiently large in volume so as to provide a relatively uniform rate of feed to a aerobic digestion process. While the refrigerated surge tank of the present invention may be used with any type of aerobic digestion system, it is particularly useful when employed in conjunction with a digester such as is described in co-pending application Ser. No. 162,181 filed July 13, 1971 by Robert Fletcher.

The present invention contemplates that the sewage will be generally cooled to a reduced temperature. Since the bacterial process by which sewage is digested does not cease abruptly at any given temperature, those skilled in the art will be aware that the temperature to which the sewage is reduced may vary somewhat depending upon the situation. Generally, it is preferred to hold the sewage at a temperature between about 32.5 and 38° F. This temperature range substantially obviates any bacterial decomposition. While lower temperatures, such as 32° F. or lower may be employed, problems with the formation of ice in the equipment or solids precipitation are sometimes encountered. Because of the suspended particulate matter and dissolved salts or the like, the freezing point of the sewage may be somewhat below 32° F. For purposes of the present invention, it is contemplated that the minimum useful temperature is about the freezing point. While higher temperatures such as 45° F. may be used, the amount of sewage decomposition taking place at such temperatures measurably increases as compared to the preferred temperature range. The temperature reduction is in direct relationship to the time period of retention of the raw sewage. For systems, such as those designed for schools, where the sewage must be held for periods of 48–72 hours the preferred temperature range is about 32.5 to 38° F.

With respect to designing a system in which the refrigerated surge tank of the present invention is employed, it is essential that the volume of the surge tank be adequate to accumulate the excess of input volume above system capacity during the peak loads, while holding on hand sufficient volume to feed the aerobic digestion process a constant volume during slack load periods. In connection with a sewage disposal system designed to handle a large institution which generated little, if any, sewage on the weekends, an 8,000 gallon surge tank, when used in connection with a 2500 gallon digester, of the type described in co-pending application Ser. No. 162,181 filed July 13, 1971, operated to achieve a three to six hour retention time, will adequately handle the sewage of the system. A sewage disposal system for a similar institution, where no surge tank is employed, would require the digester unit of at least 5,000 gallons capacity. However, even the apparatus of increased volume would not effectively digest the initial surge of sewage which would take place each morning, and each Monday morning in particular. Although it is somewhat dependent upon the efficiency of the aerobic digestion process, it is generally believed that the surge tank should be able to hold an entire 24 hour accumulation of sewage. The twenty-four hour accumulation may be held for an extended period of time, and may be fed to the digestion process on an increasing basis during a slack sewage generation period, such as a weekend, with maximum feed occurring just before the start of the heavy surge or Monday. Those skilled in the art will appreciate the relative volumes of the surge tank and the aerobic digestion process will vary over wide limits, depending upon the input, and the efficiency of the digestion process per se. The rate of air flow must be sufficient to prevent anaerobic conditions from occurring. Hence, the air flow may vary with the volume of sewage being held.

A better understanding of the preferred embodiment of the present invention will be had by reference to the accompanying drawings in which:

FIG. 1 is a side elevational view of the refrigerated holding tank of the present invention, wherein the tank is shown in section;

FIG. 2 is a side elevational view taken in section at lines 2—2 of FIG. 1, showing the refrigerated holding tank; and FIG. 3 is a cut-away perspective view of the cooling chamber, showing the refrigeration plates therein.

Referring now to FIG. 1, the surge tank is shown generally at 10 as a horizontal cylinder with rounded ends, located below ground level 12, being held in place by a concrete pad 14 and hold-down means 16 and 18. Surge tank 10 is preferably made of stainless steel, although it may be produced from steel lined with stainless steel, or of fiberglass or other materials which are not susceptible to corrosion.

Within said tank 10, and running the length thereof are two diffusers 20 and 22 suitable for introducing finely divided bubbles of an oxygen containing gas to the sewage throughout the length of the surge tank. Oxygen containing gas, under pressure, is fed through lines 21 and 23, through pressure regulators 25 and 26, and into diffusers 20 and 22. Compressed air may be provided by compressors or blowers, not shown. Air diffusers 20 and 22 may be of conventional type, i.e., pipes with holes drilled therein, or the bubble cap type, but preferably are of the powdered metal type, which permit the introduction of extremely fine bubbles of air throughout the length of the tank.

The surge tank 10 is equipped with a vent pipe 35, which may be fashioned as shown in FIG. 1, or which may be topped with a conventional cover or a powdered metal cap, so as not to obstruct air flow. This vent permits the air from the air diffusers to escape and allows the volume of liquid in tank 10 to change without creating a pressure differential.

The cooling unit is shown generally at 50, and is shown in some more detail in FIG. 3. As is shown in FIG. 3, two pairs of cooling plates are disposed in the cooling unit 50, namely upper pair 52 and 54, and lower pair 56 and 58. The raw sewage enters the surge tank 10 through feed pipe 60, which may be simple gravity feed. The surge tank 10 equipped with a pump 40 which pumps sewage from the bottom of surge tank 10 up through pipe 42, and through Y diverter valve 43. Diverter valve 43 directs the sewage either through pipe 44 where it is circulated through cooling chamber 50, or through pipe 48 where it is fed to the aerobic sewage treatment process shown generally at 70. It is contemplated that the diverter valve 43 may also proportion the sewage between lines 44 and 48. Preferably diverter valve 43 is regulated by a time clock which is set for a one week program which will feed tank 70 at regular intervals a uniform amount of sewage. The sewage which is circulated through pipe 44 passes over cooling plates 52, 54, 56 and 58 and then back into surge tank via line 62, temperature sensing station 64 and pipe 66. In the preferred mode of operation the temperature of the sewage in tank 10 is determined by sensing means, not shown, and is compared to the temperature determined by temperature sensing station 66. When the two temperatures approach each other the compressor 58 and the chiller 55 can be shut down, since the sewage in tank 10 will be sufficiently cooled. In the preferred mode of operation, pump 40 is operated continuously, in order to achieve constant mixing or agitation of the sewage. When the temperature sensing devices in tank 10 indicate the sewage temperature is rising above the desired range, the compressor 58 and chiller 55 are activated and the cooling cycle commences.

Pump 40 thus fulfills two or three functions, namely: (1) to pump the sewage to be digested into the aerobic process at a regulated rate (which may conveniently be controlled by a clock or a sensing mechanism), (2) to circulate the sewage through the cooling system in order to maintain the temperature of material in tank 10 at the desired level, and (3) to act as a mixing or agitating mechanism for the sewage being held in tank 10. Cooling plates 52, 54, and 58, are preferably filled with a liquid cooling medium, such as a glycol-water mixture, which enters cooling unit 50 via inlet line 51 and emerges from line 55 where it returns to chiller 55. The chiller unit 55 is used to refrigerate the glycol-water mixture and is powered by a conventional refrigeration compresser 57. It is generally desired that the cooling medium (exemplified by the glycol-water mixture) flow through pipe 51, through pipe cooling plates 52, 54, 56, and 58 and return by line 59 to chiller 55. It is preferred that the cooling medium be held at a temperature not substantially below the freezing point of water, in order to avoid the formation of ice within the cooling unit 50.

In constructing the preferred embodiment of the refrigerated surge tank of the present invention, it is preferred to use a generally horizontal cylinder, as illustrated in the drawings, although other geometric shapes may be used. Further, it is preferred that the floor or bottom surface of the cylinder be pitched towards pump 40 in order that pump 40 be capable of pumping substantially all the sewage from the tank. It is also preferred that the tank be equipped with manhole device 11 which permits access to the tank for cleaning and maintenance purposes. Preferably the tank will have rounded ends in order to eliminate corners or pockets which may entrap solid particles in the sewage or which may cause dead spots and consequent localized anaerobic digestion. It has been found that the introduction of air through headers 20 and 22 help to prevent the existence of localized dead areas. It is considered important that the headers run substantially the length of the tank in order to provide aeration or oxygenation of all of the sewage being held.

It is also contemplated that the tank may be equipped with a screw conveyor or other conveying device at bottom, dead center, in order to move any settled out solids towards pump 40 in order to remove any accumulated solids in the tank.

Preferably surge tank 10 is provided with a gravity over flow pipe 68, which will permit sewage to flow to the aerobic digestion process in the event of pump failure or the like.

In operation of the refrigerated sewage surge tank, liquid sewage input comes from the point of generation and enters the tank 10 through feed line 60. While it is possible to direct the input sewage through the cooling unit prior to feeding it to the surge tank, it is preferred to feed the sewage initially into the tank 10. In some cases a large volume surge might overload the capacity of the cooling unit and cause a stoppage in the non-preferred mode. Further, the present invention contemplates by-passing the refrigerated surge tank for controlled or measure volumes of sewage, so that during peak operations, it is not necessary to refrigerate all of the sewage. Operating in the preferred mode, a large surge is dumped into a quantity of sewage which is already cooled to the desired low temperature, thus immediately chilling the incoming sewage to an average temperature. Temperature sensors in tank 10 will immediately start the cooling system including pump 40. Thus, the maximum capacity of the cooling system is used without any possibility of sewage back-up or overload in the system and inlet lines.

In operation pump 40 pumps the sewage from tank 10 through pipe 42, diverter valve 43 and pipe 44, and into cooling unit 50, where it proceeds through the spaces within cooling unit 50 exterior of cooling plates 52, 54, 56, and 58. The cooling plates are filled with a glycol-water mixture which is held at a temperature close to 32° F. If the volume of the sewage entering cooling unit 50 is low, the glycol-water mixture may, by an appropriate valving system, not shown, supply glycol-water to only plates 56 and 58, leaving plates 52 and 64 substantially uncooled. If the cooling capacity of the lower pair of plates is adequate, the liquid level in tank 50 may remain at or below the half-way level.

In the preferred mode of operation, the chilled sewage exits from cooling unit 50 by exit pipe 62 past temperature sensing station 66 via pipe 66 to tank 10. The temperature sensing devices in tank 10 are pre-set to match the temperature sensed by sensing station 66, and when the temperatures approach each other, the refrigeration unit is turned off. Preferably the pump 40 continues to operate in order to recirculate the sewage and maintain the suspended solids in suspension.

Alternatively pump 40, may be actuated by either of two means. Primarily pump 40 must act as a feed pump to the aerobic digestion system process shown generally at 70, and for this purpose pump 30 may be actuated by a timed mechanism, not shown, which will meter a regulated quantity of feed into the aerobic digestion system. Secondly, the pump 40 may be actuated by a temperature sensing mechanism within tank 10, whereby if the temperature rises above a given limit, a portion of the sewage from tank 10 is recirculated through the cooling unit 50 and back into tank 10.

If desired, the chilled sewage feed emerging from valve 46 may pass through a heat exchanger, not shown, in order to warm the sewage being fed to the aerobic digestion process, while at the same time cooling something else, such as the refrigerant of compressor 57. Those skilled in the art will appreciate that the passage of chilled sewage through pipe 48 at regular intervals provides a valuable heat sink for use in various thermodynamic processes.

As was mentioned above, the tank 10, as well as cooling unit 50 may be made from many different materials, depending upon the specific requirements of the installation. While stainless steel construction is generally preferred because of its corrosion resisting ability, it is more expensive than other type of construction, such as fiberglass, steel lined with fiberglass and others.

Many variations may be used in actually constructing the tank. For instance it is possible to employ cooling coils, or cooling plates within the tank proper, or within the wall of the tank in order to maintain the low temperature of the tank. Obviously, the tank may be insulated, although in the preferred embodiment, the tank is beneath the surface of the ground, providing natural insulation thereto.

The headers for the air introduction may be arranged in any desired manner, although the drawings illustrate the preferred manner. These may be made a part of the floor structure, using fiberglass technology, building the headers into the surface of the floor of the tank. This technique is compatible with the aim of the invention in leaving a minimal of dead spots or obstructions which can interfere with the flow of the suspended solids in the liquids. Alternatively, the air diffusers may be constructed so that they are readily removable for maintenance purposes.

Pump 40 is illustrated as being a submerged pump, but it may be placed above the main tank as well as within the main tank. It is generally preferable that the pump be of variable speed design, whereby it can be regulated automatically to operate on a recycle speed, or a feed speed whereby the sewage is pumped into the aerobic digestion system. The sewage being pumped by pump 40 may be controlled by valves placed in lines 44 or 48 as well as by diverter valve 43. The precise form of plumbing or pipe hook up forms no essential part of this invention and many variations will be obvious to those skilled in the art.

Those skilled in the art will be aware that this entire unit, including the supporting pad can be made as a one piece package. Generally speaking these units can be accommodated on low boy trailers, and trucked to the site of installation, after having been completely fabricated in factory. Such an arrangement may reduce the overall cost of the unit down since there is very little on-site plumbing required.

The cooling chamber 50 is illustrated as having cooling plates therein. Those skilled in the art will be aware that typical cooling coils or cooling jackets may be used in lieu thereof although high surface area heat exchangers are generally preferred. As was mentioned above, it is generally preferred to use a glycol-water mixture running through the cooling mechanism in order to avoid sub-freezing temperatures and accumulation of ice crystals. The glycol-water mixture may be chilled by any convenient method such as by conventional Freon refrigeration units.

Air for use in the air diffusers is provided by conventional means, such as blowers, or compressors. The present invention also contemplates chilling the air prior to feeding it through the air diffusers, in order to avoid warming up the sewage within the tank.

The present invention also contemplates heating the feed going to the digester. This may be accomplished by a heat exchanger mentioned above, or can be accomplished by a simple ordinary heating device such as steam, gas or the like. It has been found that the injection of large quantities of chill feed can shock the bacteria in the aerobic digestion system, and diminish the capacity of the aerobic system. However, such a slow down may be advantageously employed on weekends, when it is desired to run the digestion process slowly.

In designing a complete sewage disposal system, it is possible to use several refrigerated tanks, as illustrated in the drawings, in tandem, or in series to provide feed to a single aerobic digestion system. In this manner, efficiencies in cooling the sewage being retained may be achieved. For instance, a single compressor may be used to chill the raw sewage going into several tanks. Alternatively, during peak periods, the tanks can be bypassed and the sewage fed directly into the aerobic digestion process.

It is preferred that the compressed air which is fed to the air headers be regulated by pressure according to the depth of the liquid in the tank. In this way a relatively uniform input of air may be achieved.

As used herein, the term "oxygenate" shall include the introduction of any oxygen containing gas, including air, oxygen or mixtures thereof.

The forms of invention herein shown and described are to be considered only as illustrative. It will be apparent to those skilled in the art that numerous modifications may be made therein without departure from the spirit of the invention or the scope of the appended claims.

We claim:

1. In a method of aerobically digesting sewage from a source which provides sewage at variable rates, the step of accumulating sufficient quantity of said sewage to permit feeding said sewage to said aerobic digestion process at a uniform rate, and refrigerating said accumulated sewage to a reduced temperature which substantially obviates any decomposition.

2. A method as described in claim 1, wherein said accumulated low temperature sewage is aerated.

3. A method as described in claim 2, wherein said sewage is reduced to a temperature below 45° F., but above its freezing point.

4. A method as described in claim 2, wherein said sewage is reduced to a temperature between 32.5 and 38° F.

5. In a method of aerobically digesting sewage from a source which provides a raw sewage at variable rates, the step of reducing the temperature of raw sewage feed to a low temperature, accumulating a quantity of said low temperature sewage, and feeding said low temperature sewage as feed to an aerobic digestion process at a uniform rate.

6. A method as described in claim 5, wherein said accumulated low temperature sewage is oxygenated.

7. A method as described in claim 6, wherein said sewage is reduced to a temperature below 45° F., but above its freezing point.

8. A method as described in claim 6, wherein said sewage is reduced to a temperature between 32.5 and 38° F.

9. In a system for aerobically digesting sewage which input sewage is received at a non-uniform rate, a surge tank adapted to accumulate said input sewage, and a refrigeration means associated with said surge tank adapted to cool the sewage in said surge tank to a reduced temperature, and to maintain it at said reduced temperature, and thereby avoid decomposition of said sewage, feed means associated with said surge tank being adapted to feed sewage at uniform volume to said aerobic digestion system.

10. In a system as described in claim 9, an aeration system within said surge tank.

11. In a system as described in claim 9, said refrigeration means adapted to cool said input sewage prior to the sewage reaching said surge tank.

12. In a system as described in claim 9, said refrigeration means adapted to cool said accumulated sewage by recycling.

13. In a system as described in claim 9, wherein said refrigeration means is adapted to cool the sewage at a temperature below 45° F., but above its freezing point.

14. In a system as described in claim 9, wherein said refrigeration means is adapted to cool the sewage at a temperature between 32.5 and 38° F.

15. In a system as described in claim 9, wherein said surge tank is large enough to hold the sewage input received in a 24-hour period.

16. In a system for aerobically digesting sewage which input sewage is received at a non-uniform rate, a refrigeration means associated with said input sewage adapted to cool said input sewage to a low temperature, a surge tank adapted to hold a substantial volume of low temperature sewage, feed means associated with said surge tank adapted to feed said refrigerated sewage to said aerobic digestion system at a uniform rate.

17. In a system for aerobically digesting sewage, as described in claim 16, aeration means within said surge tank adapted to inject an oxygen containing gas into said refrigerated sewage.

References Cited

UNITED STATES PATENTS

| | | | |
|---|---|---|---|
| 1,161,600 | 11/1915 | Orten-Boving | 210—71 |
| 2,516,076 | 7/1950 | Schlenz | 210—12 |
| 2,703,782 | 3/1955 | Regan et al. | 210—71 X |
| 2,847,379 | 8/1958 | Spiegel et al. | 210—12 X |
| 3,487,014 | 12/1969 | Liljegren | 210—12 X |
| 3,677,405 | 7/1972 | Keith | 210—181 X |

SAMIH N. ZAHARNA, Primary Examiner

T. G. WYSE, Assistant Examiner

U.S. Cl. X.R.

210—15, 71, 177, 181